United States Patent [19]

Bergk

[11] 4,307,384
[45] Dec. 22, 1981

[54] APPARATUS FOR OPTICAL INDICATION OF VALUES

[75] Inventor: Günter Bergk, Raunheim, Fed. Rep. of Germany

[73] Assignee: VDO Adolf Schindling AG, Fed. Rep. of Germany

[21] Appl. No.: 133,953

[22] Filed: Mar. 25, 1980

[30] Foreign Application Priority Data

Mar. 24, 1979 [DE] Fed. Rep. of Germany ....... 2911709

[51] Int. Cl.³ .............................................. G08B 5/38
[52] U.S. Cl. ................................. 340/366 D; 340/318
[58] Field of Search ................... 340/318, 755, 366 D

[56] References Cited

U.S. PATENT DOCUMENTS

| | | | |
|---|---|---|---|
| 737,359 | 8/1903 | Currah | 340/755 |
| 2,939,105 | 5/1960 | Fryklund | 340/366 D |
| 3,346,299 | 10/1967 | Meyer | 340/318 |

Primary Examiner—Harold I. Pitts
Attorney, Agent, or Firm—Eric P. Schellin

[57] ABSTRACT

A periodically energized luminous element mounted on a body undergoing cyclic movement at a high speed producing periodic illumination at a frequency exceeding the fusion frequency of the human eye. The interval duration of said periodic illumination results in perception thereof as a permanent visual display disposed at a fixed location along the travel path of the body corresponding to a physical value to be represented.

5 Claims, 15 Drawing Figures

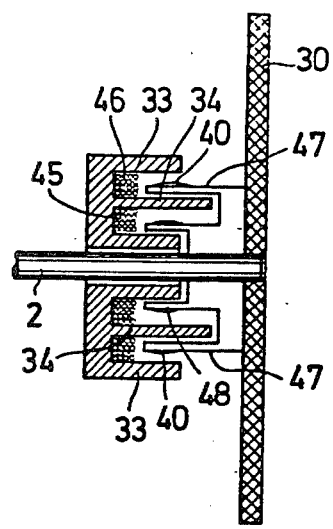
FIG. 8
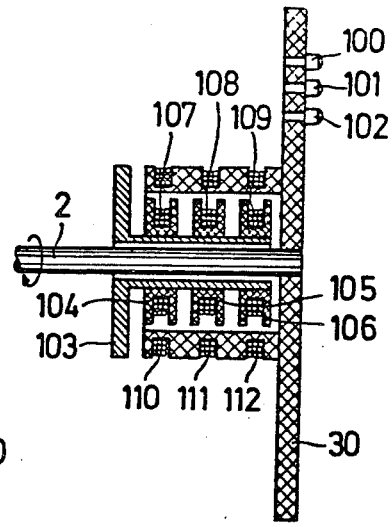
FIG. 9
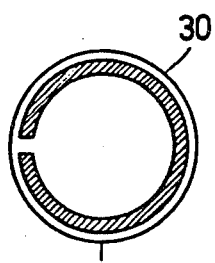
FIG. 10b
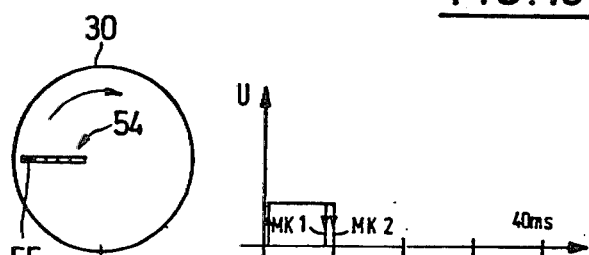
FIG. 10a
FIG. 10c
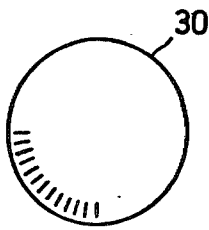
FIG. 10d
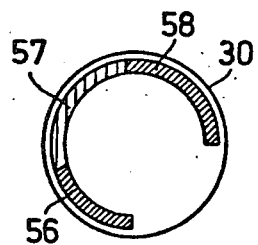
FIG. 10e

APPARATUS FOR OPTICAL INDICATION OF VALUES

BACKGROUND OF THE INVENTION

The invention relates to an apparatus for the optical indication of values, comprising at least one luminous element mounted on a movable body.

For the indication of physical values, e.g., velocities, time periods, lengths, frequencies, or temperatures, analog and digital indicators are known. In the analog devices, the value to be represented is indicated by a hand or the like continually changing its position. Known applications of such analog indications are speedometers or revolution indicators in motor vehicles, mercury columns of thermometers, or hands of clocks or watches. Lately, more and more often digital indicators are employed wherein the numerical value of a physical quantity is directly indicated by means of numbers, e.g. through seven-segment indications.

Besides analog and digital indications of values, hybrid indications have also been proposed wherein punctiform or dash-shaped luminous elements can be coupled in such a way that they form hands or the like. E.g., a wrist watch is known whose hands consist of luminous elements arranged on a straight line, these hands advancing step by step.

Such a quasi-analog indicator is also known in radar devices that are provided for recognizing schools of fish. In such case the display is in the form of a rotating neon tube on a circular scale (Heathkit Fisch-detector MI-2900).

The objective of the present invention is to provide a quasi-analog indicator for the representation of physical values, which can be produced by simple means.

SUMMARY OF THE INVENTION

According to the invention, this objective is achieved by means of a luminous element that can be made to light up at specific times and for prespecified time periods.

The advantage realized by the invention resides particularly in a linear indication range of 360° and use of only one luminous element. By means of this luminous element either a point, a luminous ring, or a luminous ring with blacked-out gaps may be displayed. Furthermore, it is possible to produce, by means of several luminous elements several luminous rings etc., or—with the use of varicolored luminous elements—mixed colors.

BRIEF DESCRIPTION OF DRAWINGS

Embodiments of the invention described hereinafter in greater detail are illustrated in the drawings wherein there are shown:

in FIG. 8, a side section view showing an inductive energy coupling of the indicator disc;

in FIG. 9, a side section view showing an inductive transmission for three light-emitting elements;

in FIGS. 10a–10e, section through various constructions of the circular disc;

DETAILED DESCRIPTION OF PREFERRED EMBODIMENTS

Figure 1:
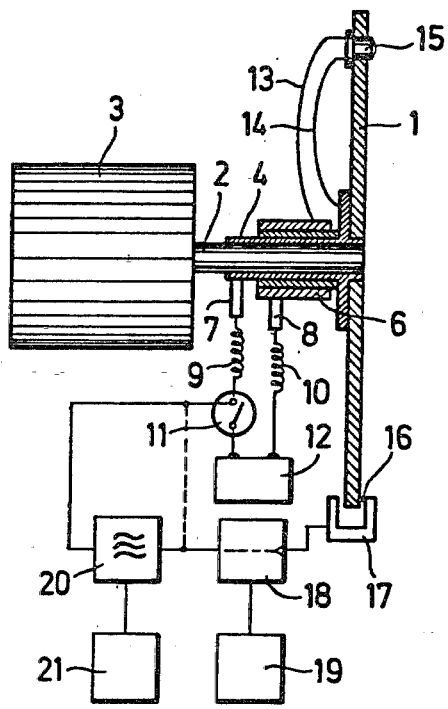
in FIG. 1, the side view of an apparatus of the invention in partial section with slip ring energy supply schematically shown.

FIG. 1 shows an embodiment of the principle underlying the apparatus of the invention by which physical values can be optically represented. Here a circular disc 1 is driven by a motor 3 via a shaft 2. Shaft 2 is enclosed within a first contact sleeve 4 which in turn is enveloped by an insulating sleeve 5. A second contact sleeve 6 is supported on the said sleeve 5. The first contact sleeve 4 and the second one 6—both to be considered as slip rings—engages stationary sliding contacts 7,8 respectively, under the bias of springs 9,10 respectively. The said sliding contacts are connected, via a controllable switch 11, to a voltage source 12.

From each of contact sleeves 4,6 a connecting line 13, 14, respectively, leads to a light-emitting diode 15 provided on disc 1, to which diode 15 electric energy is fed thereby. Disc 1, moreover, has on its periphery a signal transmitter 16 which cooperates with a signal receiver 17. The output of signal receiver 17 is connected to a timing circuit 18 which can be controlled by an adjusting device 19. From the output of timing circuit 18 a connection leads to an oscillator 20 which can be controlled, via a further adjusting device 21 with respect to its oscillation frequency. Switch 11 can be controlled via the output of oscillator 20 or also directly via the output of timing circuit 18.

The mode of operation of the apparatus shown in FIG. 1 is as follows:

By means of motor 3 disc 1 is set in a rotary motion of such kind that diode 15 is perceived by the human eye as a mere dash. The rotation frequency of disc 1 exceeds therefore the fusion frequency of the human eye, i.e. about 25 revolutions per second.

When diode 15 is—by the closing of switch 11—connected to voltage, at first only a luminous circle is perceived. This closed circle, however, may be interrupted by having the diode connected to voltage during only a fraction of the time of a revolution of disc 1. In order to determine this fraction, signal receiver 17 determines the passage of signal transmitter 16, that is to say a specific point on the periphery of the disc is made the zero point. From this zero point the time period for which diode 15 is to be connected to electric power can be determined. In this process timing circuit 18 is activated each time, after signal transmitter 16 has passed the signal receiver. Timing circuit 18 transmits then for a time period determinable by adjusting device 19 an output signal which effects the closing of switch 11. Diode 15 lights therefore up during this time. If the time at 25 revolutions per second of the disc is adjusted to 1/50 second, the eye recognizes merely a luminous semicircle. By the superposition of a frequency of oscillator 20 this luminous semicircle can be interrupted once more in an alternating manner.

Figure 2:
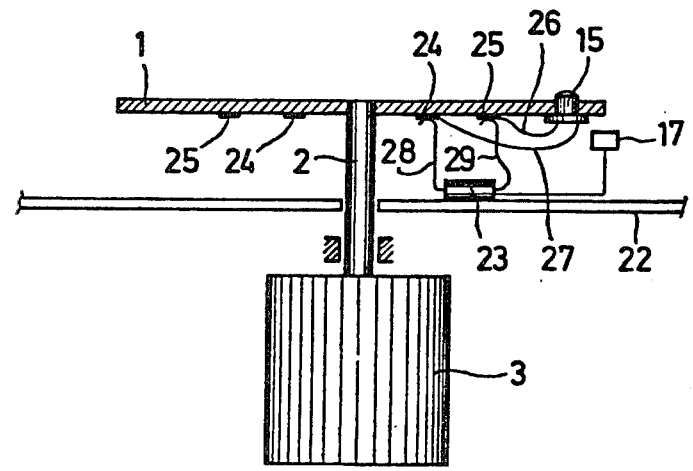
in FIG. 2, a modification of the slip ring energy supply.

In FIG. 2 a further representation of the principle is shown wherein the electric power is passed via sliding contacts to a luminous diode. Disc 1 is in this structure again driven, via a shaft 2, by a motor 3. A plate 22 is provided between disc 1 and motor 3, which plate 22 has a power supply and evaluating device 23. This device 23 receives signals from a signal receiver 17 ad evaluates these signals in a manner similar to that already described in connection with FIG. 1.

On the bottom side of disc 1 metal paths 24, 25 are provided to which electric lines 26, 27 from luminous diode 15 are connected. Sliding contacts 28, 29 which feed electric power to paths 24,25 are also connected to these paths 24, 25.

Figure 3:
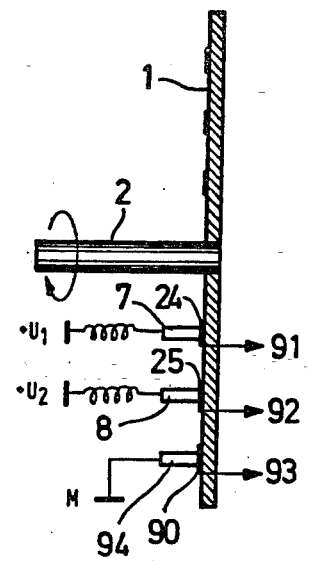
in FIG. 3, a slip ring transmission for two luminous circuits.

FIG. 3 shows a slip ring transmission for two luminous circuits, which slip ring transmission makes it possible to feed two voltages U, and $U_2$ to two luminous elements 91 and 92, in which structure numeral 93 represents the common third connection which by means of a brush 94 is connected to the earth.

Figure 4:
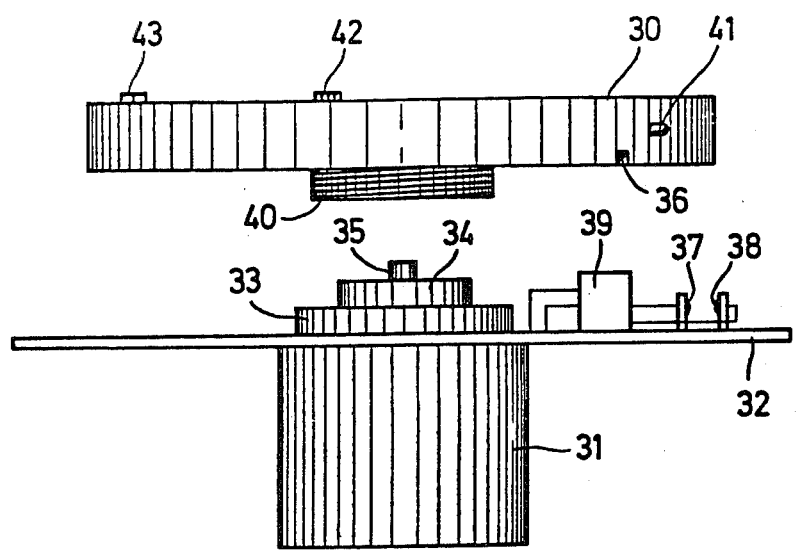
in FIG. 4, a side-view of a motor-driven indicator disc.

FIG. 4 shows an apparatus wherein the electric power for the luminous elements is transmitted without contact. Again a disc 30 can be seen which—for clarification of the invention—is lifted off from a motor 31. Between motor 31 and disc 30, a plate 32 is provided with which motor 31 is flange-connected and which is provided with two concentric shells 33,34. The drive shaft 35 of motor 31 is positioned within the smaller shell core 34 and is perforated. A notch 36 is provided in the periphery of disc 30 and acts as signal transmitter. In the operative state, i.e. when disc 30 is connected with the perforated drive shaft 35, the edge of disc 30 passes through a light barrier consisting of a light source 37 and a light sensor 38, so that each time when notch 36 passes the light barrier, light sensor 38 responds. The control impulses of the light barrier are then transmitted to an evaluating device 39 which controls coils—not visible in FIG. 3—within shell cores 33,34. These coils are connected to voltage and induce in a further coil 40 positioned on a cylindrical casing connected with disc 30 a voltage which feeds electric power to a luminous element.

This luminous element, e.g. a diode 41 mounted on the periphery of disc 30, then lights up during the time of power supply. Instead of one diode 41 mounted on the perphery, several diodes 42,43 may also be provided on the surface of disc 30 which are connected in parallel or in series to the induced voltage.

Figure 5:
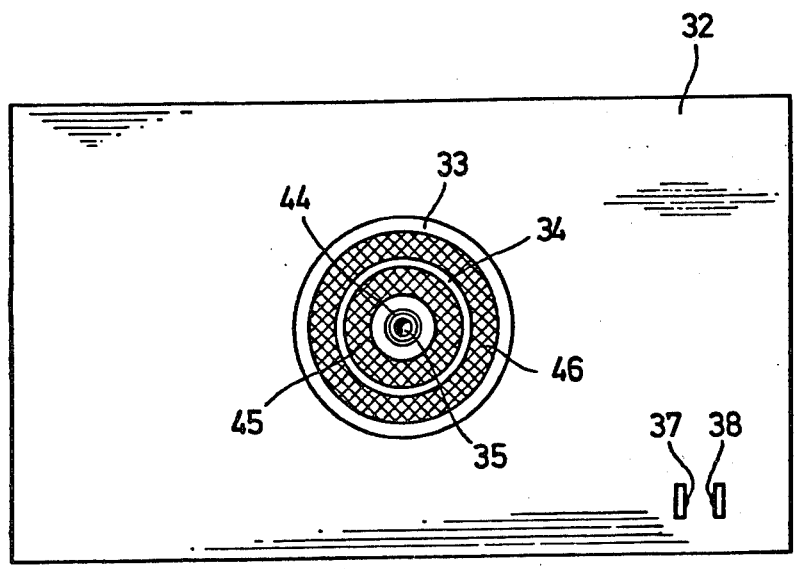
in FIG. 5, a planview of the motor drive.

FIG. 5 shows a planview upon plate 32 wherein shell cores 33, 34 and drive shaft 35 are recognizable. Drive shaft 35 is surrounded by a further shell 44 which limits a coil 45 on one side while the other side of this coil 45 is limited by shell core 34. In the interspace between shell core 33 and shell core 34 a further coil 46 is provided. Both coils 45, 46 are separately controllable via a device 39, so that, e.g. two different luminous diode 41, 42, or 42, 43 can be separately made to light up.

Figure 6:
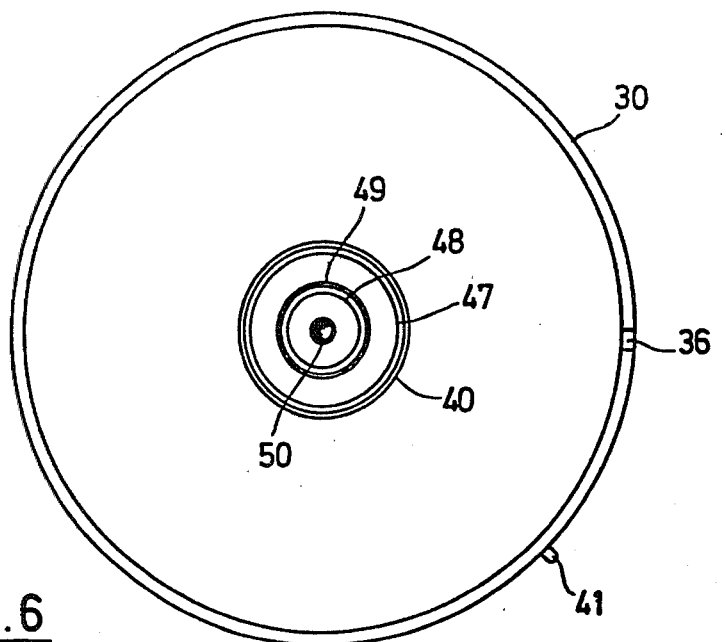
in FIG. 6, an indicator disc from below.

FIG. 6 shows disc 30 once more in greater detail, namely in a view from below. Again notch 36 positioned on the periphery of disc 30 is recognizable, also coil 40 positioned on a cylindrical casing 47. On a further cylindrical casing 48, arranged concentrically to the first cylindrical casing 47, a coil 49 is likewise mounted. By means of the two coils 40, 49, e.g. two different diodes or diode chains can be controlled.

In the center of circular disc 30, there is a pin 50 which serves to establish the connection with the motor.

When disc 30 is coupled with motor 31 (FIG. 4), pin 50 of disc 30 engages therefore the bore of pin 35 (FIG. 5), and at the same time cylindrical casing 47 with coil 40 assumes the position between shell cores 33, 34 while cylindrical casing 48 with coil 49 comes to be positioned between shell core 34 and pin 35.

Figure 7:
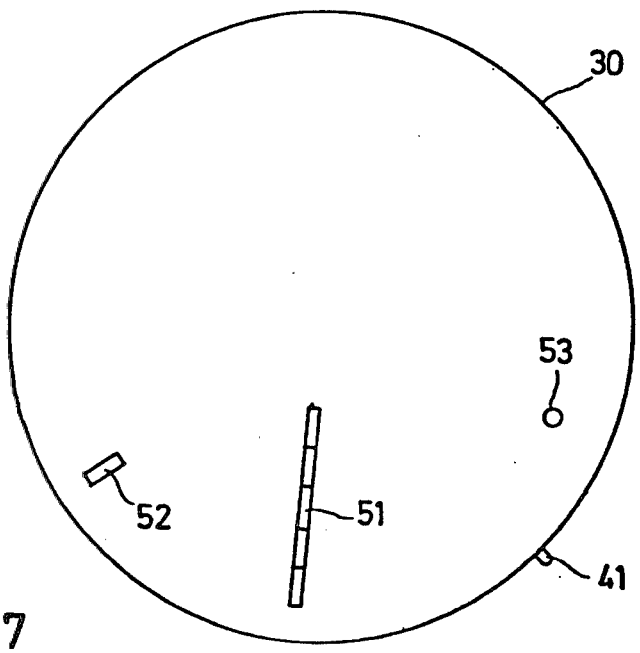
in FIG. 7, a planview of the indicator disc.

In FIG. 7, disc 30 is once more shown in planview. Again luminous diode 41 is recognizable on the periphery, and a luminous element chain 51, two further luminous elements 52 as well as a further luminous diode 53 can also be seen.

In FIG. 8, shell cores 33, 34 of FIG. 5 and coil 40 of FIG. 4 are once more shown in section from the side. The oscillator and primary windings are in this structure positioned in the lower portion of the stationary shell core half. The secondary windings, on the other hand, are—like two superposed loudspeaker moving coils—enclosed within the stationary shell core.

FIG. 9 shows by way of example in which manner three different light-emitting diodes 100, 101, 102 are separately controllable by inductive means. A stationary flange 103 with three roll cores 104, 105, 106 which contain windings 107, 108, 109 for three oscillators is provided. Windings 107, 108,109 form the primary part of the inductive transmission. The three associated secondary windings 110, 111, 112 rotate exactly above the corresponding associated primary part.

FIG. 10a shows a circular disc 30 similar to that shown in FIG. 6; however, only five light-emitting diodes 54 are shown. When by one of these diodes 54, e.g. the diode 55 arranged on the outer edge, a migrating luminous spot is to be represented, disc 30 is rotated at e.g. 1500 revolutions per minute, which corresponds to a time of revolution of disc 30 of 40 milliseconds. Diode 55 is then switched on for specific time periods.

The moment at which the timing begins is positioned in point S. At this moment s time element, e.g. a monostable relaxation stage MK1 is activated by a light barrier impulse. After the expiration of the impulse duration of relaxation stage MK1 a second relaxation stage is then triggered, in which process the impulse length of MK determines the release period of the inductive transmission and thus the light period of the diodes.

In the use of a monostable relaxation stage as timing circuit, it is possible to enlarge steadily in a simple way also a gap in a circular luminous beam (FIG. 10b). i.e. instead of a point a gap migrates. To this end, the same impulse diagram is employed as shown in FIG. 10. The inductive transmission, however, is in this case controlled by the inverted output of the second monostable relaxation stage MK2. The impulse length of the second relaxation stage MK2 determines in this process the width of the luminous gaps, while the impulse length of the first relaxation stage MK1 determines the position of the gap.

FIG. 10c shows in which manner a beam changeable in length can be represented. In this case disc 30 is again rotated at 1500 revolutions per minute, and a monostable relaxation stage is steadily varied with respect to its relaxation time. The triggering takes place again by light barrier impulses. The luminous element is then lit according to the impulse length of this relaxation stage. When by means of this arrangement which needs only one relaxation stage and one luminous element, a constant and arcuate beam is to be represented, the luminous diode 55 is switched on for 20 milliseconds only per disc revolution, this, however, 25 times per second. For the observer whose eye can no longer disentangle such a frequency, the result is therefore an absolutely stationary and flicker-free light beam of arcuate shape.

In FIG. 10d, a further modification is shown which permits the production of a dash beam changeable in length with only one diode. This diode is suitably very narrow and sharply defined. The impulse diagram is in this structure the same as in FIG. 10c; only an additional measure is taken in order to produce the gaps between the dashes. This measure may consist, e.g., in that the directional characteristic of a light-emitting diode is coupled with a corresponding oscillator frequency of the inductive transmission. In this case, the following formulas apply $$(f/u) = (U/a)$$

$$(u/a) = Z$$

wherein
  f = oscillator frequency of the inductive transmission in Hz;
  u = revolutions of the motor or luminous element per second;
  U = circumference of the circle of the luminous element in mm;
  a = distance of the dashes in mm;
  Z = number of the dashes relative to a 360° circumference.

When, e.g., one dash per degree of angle is to be represented, Z = 360°. The oscillator frequency of the inductive transmission is then calculated generally according to the following equations:

$$(f/u) = (U/a) \text{ or } (f/u) = Z \text{ or } f = u \times Z$$

At a number of motor revolutions of, e.g. 1500 revolutions per minute = 25 revolutions per second, there follows from this formula a frequency f = 25 × 360 = 9000 Hz. On account of the directional characteristic of the luminous diode, the latter lights up during a half cycle only while during the other half cycle an illumination break occurs. The manner of dash formation described above is particularly suitable for a large number of dashes per periphery.

When only a few dashes or segments per periphery are to be represented, e.g. sixteen segments per periphery, f = 400 Hz and for the duration of a monostable relaxation stage an astable relaxation stage can be released. This astable relaxation stage then releases the inductive transmission.

FIG. 10e shows another representation modification, which makes it possible to represent by means of two adjacent light-emitting diodes of different color, e.g. green or red, a luminous beam with three changing colors, e.g. red, green, and yellow-orange. Due to the rotation of the simultaneously luminous green and red diodes, a yellow-orange color is perceived by the eye. The impulse diagram shown in the figure produces under these conditions e.g. at the time $t_1$ a green beam 56, at the time $t_2$ a yellow orange beam 57, and at the time $t_3$ a red beam 58. The successive sequence of the switching-on of the diodes has therefore for the human eye the effect of a spatial side by side.

Figure 11:
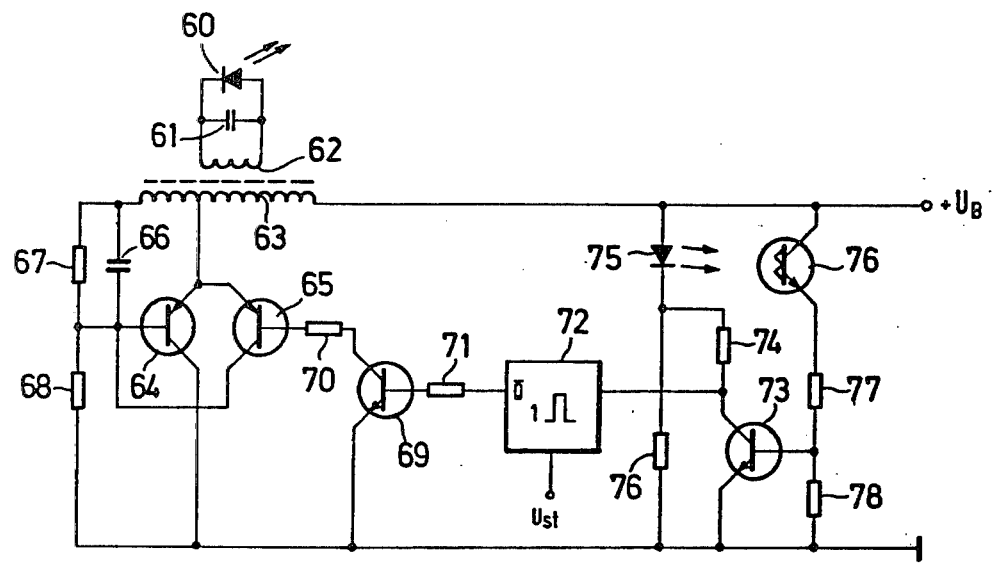
in FIG. 11, a circuit for the connection of luminous elements.

FIG. 11 shows in greater detail a circuit arrangement suitable for the production of a luminous beam with dash pattern. A luminous diode 60 is in this structure positioned, together with a parallel-connected condenser 61 and a parallel-connected coil 62 on a rotating disc while the other structural elements are stationary. These stationary structural elements include a primary winding 63 which is tapped at one point, this tapping point being connected to the emitters of two transistors 64 and 65. The collector of transistor 65 is connected to the base of transistor 64 as well as to a condenser 66 and two resistors 67, 68, in which structure condenser 66 and resistor 67 are connected in parallel and are also connected to one contact of primary winding 63. The collector of transistor 64 and resistor 68 are grounded like the emitter of a further transistor 69 whose collector is connected, via a resistor 70, to the base of transistor 65. From the base of transistor 69 a connection leads, via a resistor 71, to the output of a monostable relaxation stage 72 whose input is connected to the collector of a further transistor 73 whose emitter is grounded and whose collector is connected, via a resistor 74, to the cathode of a luminous diode 75 and to a sensor 76.

The anode of diode 75 is connected to positive battery potential while the second contact of sensor 76 is grounded. The sensor and two resistors 77, 78 are connected in parallel to the battery voltage, the connecting point between the two resistors 77, 78 being connected to the base of transistor 73.

The oscillator for the inductive transmission is form by means of the two transistors 64, 65, of which transistor 64 forms the oscillator transistor, and transistor 65 the release transistor. Between this oscillator and the current-controlled or voltage-controlled monostable relaxation stage 72 a decoupling stage in the form of a transistor 69 is inserted. The structural elements 73 to 78 form in their totality a light barrier for generating the starting impulse for the monostable relaxation stage. The light barrier in the narrower sense is in the structure formed by luminous diode 75 and sensor 76.

At a speed of rotation of disc 30 of 25 revolutions per second and at an oscillation frequency of 9000 Hz there results with the circuit of FIG. 11 a dash pattern of the luminous beam of 360 dashes on the periphery. For the representation of a smooth continuous luminous beam, it is merely necessary to select a substantially higher oscillator frequency or to make the luminous diode 60 light up in the positive or negative semi-cycle by rectification.

In the light barrier a relaxation effect with hysteresis is achieved by a special feedback via the luminous intensity of the diode. This results in very steep-area output impulses which are independent of the speed of the optical break and thus are exact start impulses for the voltage-controlled or current-controlled monostable relaxation stage.

Although the invention has been described with the aid of a rotating disc only, it is evident that it can also be used in linearly movable devices. For instance, a tape passing over two rolls may be provided with luminous elements, in which structure this tape passes at a certain speed over the rolls and the luminous elements are controlled in a specific manner.

Insofar as various colors are to be produced by additive color mixing, luminous diodes can be employed advantageously which transmit various colors (cf. DE-AS 23 44 774, U.S. Pat. No. 3,580,860). RCD'S (Electrochemical Diffused Collector transistors) may also be employed (Elektronik, Number 2, page 11).

I claim:

1. In a device for visually indicating physical values having a body undergoing cyclic movement at a uniform speed along a predetermined path, at least one luminous element mounted on the body, and a source of energy connected to the luminous element for periodic emission of illumination therefrom at predetermined locations along the path corresponding to the physical values as perceived by the human eye of an observer, the improvement comprising motor means connected to the body for imparting said movement thereto at a speed establishing said periodic illumination at a flash frequency exceeding the fusion frequency of the human eye, and flash control means operatively connected to the luminous element for limiting said periodic illumination to flash intervals of a duration enabling uninterrupted perception thereof as permanent displays at said predetermined locations.

2. The improvement as defined in claim 1 including adjusting means (19) connected to the flash control means for varying the interval duration to change the permanent display between a spot and a beam.

3. The device as defined in claim 1 wherein said body is a rotary disc (1, 30).

4. The device as defined in claim 1 wherein said luminous element is a light-emitting diode (15).

5. The improvement as defined in claim 1 wherein the flash control means includes a frequency control oscillator connected to the source for controlling energization of the luminous element at said flash frequency, and timing means connected to the oscillator and responsing to said movement of the body for controlling the duration of energization of the luminous element corresponding to said intervals of illumination.

* * * * *